(12) United States Patent
Iwata

(10) Patent No.: US 11,695,186 B2
(45) Date of Patent: Jul. 4, 2023

(54) NONAQUEOUS ELECTROLYTE SECONDARY BATTERY LAMINATED SEPARATOR

(71) Applicant: Sumitomo Chemical Company, Limited, Tokyo (JP)

(72) Inventor: Shizuka Iwata, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 559 days.

(21) Appl. No.: 16/848,883

(22) Filed: Apr. 15, 2020

(65) Prior Publication Data

US 2020/0335750 A1   Oct. 22, 2020

(30) Foreign Application Priority Data

Apr. 16, 2019   (JP) ................. 2019-078114

(51) Int. Cl.
| | |
|---|---|
| H01M 50/00 | (2021.01) |
| H01M 50/446 | (2021.01) |
| H01M 4/62 | (2006.01) |
| H01M 50/417 | (2021.01) |
| H01M 50/423 | (2021.01) |
| H01M 50/489 | (2021.01) |
| H01M 50/451 | (2021.01) |

(52) U.S. Cl.
CPC ........... *H01M 50/446* (2021.01); *H01M 4/62* (2013.01); *H01M 50/417* (2021.01); *H01M 50/423* (2021.01); *H01M 50/451* (2021.01); *H01M 50/489* (2021.01)

(58) Field of Classification Search
CPC ...... H01M 2/16; H01M 2/1653; H01M 2/166; H01M 2/1686; H01M 10/052; H01M 50/417; H01M 50/446; H01M 50/489; C08J 9/26; C08J 2203/20; C08J 2201/0444

See application file for complete search history.

(56) References Cited

U.S. PATENT DOCUMENTS

| | | |
|---|---|---|
| 2004/0261192 A1 | 12/2004 | Cardamone et al. |
| 2011/0269010 A1 | 11/2011 | Sawaguchi et al. |
| 2017/0155110 A1 | 6/2017 | Yashiki |
| 2017/0155119 A1* | 6/2017 | Suzuki ............... H01M 50/431 |
| 2017/0365836 A1 | 12/2017 | Ogata et al. |
| 2019/0245176 A1 | 8/2019 | Suzuki et al. |
| 2019/0319241 A1 | 10/2019 | Yashiki |
| 2020/0006734 A1* | 1/2020 | Murakami ........... H01M 50/411 |
| 2020/0335750 A1 | 10/2020 | Iwata |

FOREIGN PATENT DOCUMENTS

| | | | |
|---|---|---|---|
| CN | 107039621 A | 8/2017 | |
| JP | 2004-303473 A | 10/2004 | |
| JP | 2010221455 A | 10/2010 | |
| WO | 2018078707 A1 | 5/2018 | |
| WO | WO 2018078702 A1 * | 5/2018 | ......... H01M 50/457 |

OTHER PUBLICATIONS

Yoshimaru et al. Separator and Secondary Battery Including Separator, See the Abstract. (Year: 2018).*
Office Action issued Apr. 4, 2022 in U.S. Appl. No. 16/849,042, by Iwata.
Office Action issued Jul. 15, 2022 in U.S. Appl. No. 16/849,042, by Iwata.
Notice of Allowance dated Sep. 14, 2022 in U.S. Appl. No. 16/849,042.

* cited by examiner

*Primary Examiner* — Cynthia H Kelly
*Assistant Examiner* — Monique M Wills
(74) *Attorney, Agent, or Firm* — Panitch Schwarze Belisario & Nadel LLP

(57) ABSTRACT

The present invention provides a nonaqueous electrolyte secondary battery laminated separator which improves a long-term battery characteristic of a nonaqueous electrolyte secondary battery. According to the nonaqueous electrolyte secondary battery laminated separator in accordance with an aspect of the present invention, an absolute value of a difference between (i) a standard deviation of whiteness index in one outermost layer and (ii) a standard deviation of whiteness index of the other outermost layer is greater than 0.01 and is 0.60 or less, and a greater one of the two standard deviation values of whiteness index is 0.06 or more and 0.91 or less.

10 Claims, No Drawings

NONAQUEOUS ELECTROLYTE SECONDARY BATTERY LAMINATED SEPARATOR

This Nonprovisional application claims priority under 35 U.S.C. § 119 on Patent Application No. 2019-078114 filed in Japan on Apr. 16, 2019, the entire contents of which are hereby incorporated by reference.

TECHNICAL FIELD

The present invention relates to a laminated separator for a nonaqueous electrolyte secondary battery (hereinafter referred to as a "nonaqueous electrolyte secondary battery laminated separator").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

As a member of such a nonaqueous electrolyte secondary battery, a separator having excellent heat resistance is under development. As the separator which excels in heat resistance, a laminated separator including a porous layer which contains a heat-resistant component is known.

As an example of the laminated separator including a porous layer, Patent Literature 1 discloses a polyelectrolyte porous film in which a maximum frequency of whiteness of a surface is 70% or higher and a standard deviation of whiteness is controlled to a very small value, i.e., 0.0025 or less.

CITATION LIST

Patent Literature

[Patent Literature 1]
Japanese Patent Application Publication Tokukai No. 2004-303473

SUMMARY OF INVENTION

Technical Problem

However, the laminated separator including the porous layer as disclosed in Patent Literature 1, i.e., a conventional separator including a porous layer which contains a heat-resistant component is still insufficient in long-term battery characteristic.

Solution to Problem

The present invention has aspects described in [1] through [10] below.
[1] A nonaqueous electrolyte secondary battery laminated separator including a polyolefin porous film; and a nonaqueous electrolyte secondary battery porous layer which is stacked on one surface or both surfaces of the polyolefin porous film, an absolute value of a difference between (i) a standard deviation value of a whiteness index defined in E313 of the American Standards Test Methods in a first outermost layer of the nonaqueous electrolyte secondary battery laminated separator and (ii) a standard deviation value of the whiteness index of a second outermost layer of the nonaqueous electrolyte secondary battery laminated separator being greater than 0.01 and being 0.60 or less, a greater one of the standard deviation value of the whiteness index in the first outermost layer and the standard deviation value of the whiteness index in the second outermost layer being 0.06 or more and 0.91 or less.
[2] The nonaqueous electrolyte secondary battery laminated separator described in [1], in which: the first outermost layer is the polyolefin porous film; and the second outermost layer is the nonaqueous electrolyte secondary battery porous layer.
[3] The nonaqueous electrolyte secondary battery laminated separator described in [1] or [2], in which the nonaqueous electrolyte secondary battery porous layer contains one or more resins selected from the group consisting of polyolefin, a (meth)acrylate resin, a fluorine-containing resin, a polyamide resin, a polyester resin, and a water-soluble polymer.
[4] The nonaqueous electrolyte secondary battery laminated separator described in any one of [1] through [3], in which the nonaqueous electrolyte secondary battery porous layer contains a polyamide resin.
[5] The nonaqueous electrolyte secondary battery laminated separator described in [4], in which the polyamide resin is an aramid resin.
[6] The nonaqueous electrolyte secondary battery laminated separator described in [5], in which the aramid resin is one or more aramid resins selected from the group consisting of poly(paraphenylene terephthalamide), poly(metaphenylene terephthalamide), and a paraphenylene terephthalamide/metaphenylene terephthalamide copolymer.
[7] The nonaqueous electrolyte secondary battery laminated separator described in any one of [1] through [6], in which the nonaqueous electrolyte secondary battery porous layer contains a heat-resistant filler.
[8] The nonaqueous electrolyte secondary battery laminated separator described in [7], in which the heat-resistant filler is an inorganic filler.
[9] The nonaqueous electrolyte secondary battery laminated separator described in [8], in which the inorganic filler contains one or more inorganic substances selected from the group consisting of alumina, boehmite, aluminum hydroxide, magnesium hydroxide, magnesium oxide, titanium oxide, and silica.
[10] A nonaqueous electrolyte secondary battery including a nonaqueous electrolyte secondary battery laminated separator described in any one of [1] through [9].

Advantageous Effects of Invention

The nonaqueous electrolyte secondary battery laminated separator in accordance with an embodiment of the present invention advantageously makes it possible to provide a nonaqueous electrolyte secondary battery having an excellent long-term battery characteristic such as a charge capacity recovery rate which is exhibited through a rate test (i.e., a test for evaluating rate characteristic) carried out with respect to the nonaqueous electrolyte secondary battery after 100 cycles.

DESCRIPTION OF EMBODIMENTS

The following description will discuss an embodiment of the present invention. Note, however, that the present invention is not limited to the embodiment. The present invention is not limited to arrangements described below, but may be altered in various ways by a skilled person within the scope of the claims. The present invention also encompasses, in its technical scope, any embodiment derived by combining technical means disclosed in differing embodiments. Note that a numerical range "A to B" herein means "A or more (higher) and B or less (lower)" unless otherwise stated.

Embodiment 1: Nonaqueous Electrolyte Secondary Battery Laminated Separator

The nonaqueous electrolyte secondary battery laminated separator in accordance with an embodiment of the present invention (hereinafter also simply referred to as "laminated separator") is a nonaqueous electrolyte secondary battery laminated separator including a polyolefin porous film; and a porous layer for a nonaqueous electrolyte secondary battery (hereinafter referred to as "nonaqueous electrolyte secondary battery porous layer") which is stacked on one surface or both surfaces of the polyolefin porous film, an absolute value of a difference between (i) a standard deviation value of a whiteness index defined in E313 of the American Standards Test Methods in a first outermost layer of the nonaqueous electrolyte secondary battery laminated separator and (ii) a standard deviation value of the whiteness index of a second outermost layer of the nonaqueous electrolyte secondary battery laminated separator being greater than 0.01 and being 0.60 or less, a greater one of the standard deviation value of the whiteness index in the first outermost layer and the standard deviation value of the whiteness index in the second outermost layer being 0.06 or more and 0.91 or less.

(1. Regarding Whiteness Index and the Like)

An outermost layer of a laminated separator in accordance with an embodiment of the present invention means a surface which makes contact with an electrode in a nonaqueous electrolyte secondary battery. Therefore, in a case where one outermost layer (hereinafter sometimes referred to as "first outermost layer") of the laminated separator in accordance with an embodiment of the present invention makes contact with a positive electrode in a nonaqueous electrolyte secondary battery, the other outermost layer (hereinafter sometimes referred to as "second outermost layer") is to make contact with a negative electrode. Conversely, in a case where the first outermost layer makes contact with the negative electrode in the nonaqueous electrolyte secondary battery, the second outermost layer is to make contact with the positive electrode.

For example, in a case where the laminated separator in accordance with an embodiment of the present invention has a configuration in which nonaqueous electrolyte secondary battery porous layers (hereinafter sometimes simply referred as "porous layer") are stacked on both surfaces of a polyolefin porous film (hereinafter, sometimes simply referred to as "porous film"), each of the porous layers stacked on the both surfaces of the porous film serves as the outermost layer. Alternatively, for example, in a case where the laminated separator in accordance with an embodiment of the present invention has a configuration in which a porous layer is stacked on one surface of the porous film, the porous layer and the porous film serve as respective outermost layers.

The whiteness index (whiteness, WI) is a parameter indicative of a ratio of intensity of reflected light with respect to intensity of incoming light measured when light is caused to enter the laminated separator in accordance with an embodiment of the present invention through an outermost layer of the laminated separator. That is, the whiteness index is a parameter indicative of a recovery rate of the reflected light.

According to an embodiment of the present invention, the whiteness index of the first outermost layer means a whiteness index measured when the first outermost layer (i.e., one outermost layer) of the laminated separator in accordance with an embodiment of the present invention is irradiated with light. Moreover, the whiteness index of the second outermost layer means a whiteness index measured when the second outermost layer (i.e., the other outermost layer), which is of the laminated separator and is opposite to the first outermost layer, is irradiated with light.

An amount (intensity) of the reflected light is an amount obtained by subtracting, from an amount (intensity) of incoming light, an amount of light (absorbed light) absorbed by the laminated separator and an amount of light (scattered light) scattered inside the laminated separator.

Here, the light which has reached the laminated separator is reflected, absorbed, and scattered on and in the vicinity of the surface irradiated with the light. Therefore, the amount of the absorbed light correlates with (i) absorbance of a material itself which constitutes the outermost layer which is of the laminated separator and is irradiated with the light and (ii) an area of a colored component which is irradiated with the incoming light in the outermost layer. The area of the colored component which is irradiated with the incoming light correlates with a weight per unit area of the outermost layer. For example, as the weight per unit area becomes larger, the amount of absorbed light increases. The amount of scattered light correlates with an internal structure of the outermost layer.

In the same outermost layer, absorbance of a material itself constituting the outermost layer does not vary depending on measured portions. Therefore, the standard deviation of the whiteness index correlates with a degree to which the weight per unit area and the internal structure of the outermost layer vary depending on measured portions. From this, according to an embodiment of the present invention, the standard deviation of the whiteness index is a parameter which indicates uniformity of the internal structure of the outermost layer.

Conventionally, as the laminated separator, a laminated separator including a polyelectrolyte porous film (for example, Patent Literature 1) in which a standard deviation of the whiteness index is very small and an internal structure is uniform was considered as being excellent. However, this time, it has been found that a long-term battery characteristic of a nonaqueous electrolyte secondary battery can be further improved by a laminated separator in which (i) an outermost layer has a standard deviation of the whiteness index falling within a specific range and (ii) an absolute value of a difference (hereinafter, referred to as "difference in WI standard deviation between outermost layers") between the standard deviation of the whiteness index in a first outermost layer (i.e., one outermost layer) of the laminated separator and the standard deviation of the whiteness index in a second outermost layer (i.e., the other outermost layer) of the laminated separator falls within a specific range.

Here, in a case where charge-discharge cycles are repeated, a deposit such as foreign metal can be generated due to a side reaction between a nonaqueous electrolyte and a positive electrode material, decomposition of the nonaqueous electrolyte, and/or the like. In a case where a greater one of the standard deviations of the whiteness index in the outermost layers of the laminated separator is very small, i.e., less than 0.06 and the charge-discharge cycles have been repeated, the deposit may intrude into the laminated separator. As a result, uniformity of the internal structure of the laminated separator is decreased, and a long-term battery characteristic of a nonaqueous electrolyte secondary battery which includes the laminated separator may be deteriorated.

In contrast, according to the laminated separator in accordance with an embodiment of the present invention, a greater one of standard deviations of the whiteness index (hereinafter, also referred to as "greater WI value") in the outermost layers is 0.06 or more. The internal structure of the outermost layer in which the "greater WI value" is 0.06 or more has nonuniformity (unevenness) which cannot be visually confirmed. According to the laminated separator in accordance with an embodiment of the present invention, the nonuniformity of the internal structure of the outermost layer reduces a degree of decrease in uniformity of the internal structure of the laminated separator due to the deposit, and consequently a degree of decrease in uniformity of voids is reduced. As a result, it is possible to improve the long-term battery characteristic.

In a case where the "greater WI value" is excessively large, i.e., greater than 0.91, nonuniformity of the internal structure of the laminated separator including the outermost layer becomes too large, and there are possibilities that unevenness occurs in ion permeability and that very small short circuit occurs inside the laminated separator. This may lead to a deterioration of a battery characteristic of the nonaqueous electrolyte secondary battery including the laminated separator.

From the viewpoint of improving the long-term battery characteristic, the "greater WI value" is preferably 0.10 or more and 0.90 or less, more preferably 0.25 or more and 0.80 or less.

In the nonaqueous electrolyte secondary battery, the deposit is generated mainly from one electrode (for example, positive electrode). Therefore, according to the laminated separator in accordance with an embodiment of the present invention, a larger amount of the deposit intrudes into an outermost layer which makes contact with the electrode, and a smaller amount of the deposit intrudes into an outermost layer which does not make contact with the electrode.

From this, a degree of decrease in uniformity of the internal structure is greater in one outermost layer which makes contact with the electrode, as compared with the other outermost layer which does not make contact with the electrode.

According to the laminated separator in accordance with an embodiment of the present invention, the "greater WI value" is 0.06 or more and 0.91 or less, and the "difference in WI standard deviation between outermost layers" is greater than 0.01. Therefore, nonuniformity of an internal structure of a first outermost layer (i.e., one outermost layer) of the laminated separator (i) cannot be visually confirmed and (ii) is greater than nonuniformity of an internal structure of a second outermost layer (i.e., the other outermost layer).

Therefore, even in a case where the first outermost layer is provided so as to make contact with the electrode, the nonuniformity of the internal structure of the first outermost layer which cannot be visually confirmed suitably reduces a degree of decrease in uniformity of the internal structure of the first outermost layer due to the deposit. In this case, the second outermost layer does not make contact with the electrode, and therefore a degree of decrease in uniformity of the internal structure due to the deposit is small. Therefore, the laminated separator in accordance with an embodiment of the present invention can improve ion permeability while reducing a degree of decrease in uniformity of the internal structure of the first outermost layer due to the deposit.

As a result, the laminated separator in accordance with an embodiment of the present invention can further improve ion permeability of the laminated separator and also further improve the long-term battery characteristic, as compared with a laminated separator in which the "greater WI value" is 0.06 or more and 0.91 or less and the "difference in WI standard deviation between outermost layers" is not greater than 0.01.

According to the laminated separator in accordance with an embodiment of the present invention, the "greater WI value" is 0.06 or more and 0.91 or less and the "difference in WI standard deviation between outermost layers" is 0.60 or less. That is, the internal structure of the second outermost layer of the laminated separator is not excessively uniform but has slight nonuniformity. This reduces a degree of decrease in uniformity of the internal structure of the second outermost layer which is caused due to the small amount of deposit that intrudes into the second outermost layer.

Therefore, according to the laminated separator in accordance with an embodiment of the present invention, a degree of decrease in uniformity of the internal structure of the first outermost layer which is caused due to the deposit is suitably reduced, and also a degree of decrease in uniformity of the internal structure of the second outermost layer which is caused due to the deposit is suitably reduced.

As a result, the laminated separator in accordance with an embodiment of the present invention can further reduces a degree of decrease in uniformity of the internal structure of the entire laminated separator which is caused due to the deposit and can further improve the long-term battery characteristic, as compared with a laminated separator in which the "greater WI value" is 0.06 or more and 0.91 or less and the "difference in WI standard deviation between outermost layers" is greater than 0.60.

From the viewpoint of improving the long-term battery characteristic, a lower limit value of the "difference in WI standard deviation between outermost layers" in the laminated separator in accordance with an embodiment of the present invention is preferably 0.05 or more, more preferably 0.20 or more, and an upper limit value of the "difference in WI standard deviation between outermost layers" is preferably 0.55 or less, more preferably 0.50 or less.

The "difference in WI standard deviation between outermost layers" can be 0.05 or more and 0.55 or less, and can be 0.20 or more and 0.50 or less.

Further, the electrode from which the deposit is generated can be mainly a positive electrode. Therefore, from the viewpoint of more suitably reducing a degree of decrease in uniformity of the internal structure which is caused due to the deposit, the first outermost layer in which the standard deviation of the whiteness index is larger preferably serves as an outermost layer which makes contact with a positive electrode in a nonaqueous electrolyte secondary battery.

A method for measuring the whiteness index can be, for example, the following method. That is, black paper is placed as an underlay on an experiment base, and the laminated separator is placed on the black paper such that the outermost layer comes upward. Then, the laminated separator is irradiated with light from above. Then, under conditions of "(Conditions for measuring WI)" described later in Examples, the whiteness index is measured with use of a commercially available spectrophotometric colorimeter.

According to an embodiment of the present invention, a standard deviation of the whiteness index is obtained as follows: that is, in the above measuring method, the whiteness index is measured two or more times with respect to the same measurement target object while arbitrarily changing portions to be irradiated with light; then, from the plurality of measured values of the whiteness index, a standard deviation is calculated. In that case, the standard deviation of the whiteness index is calculated by measuring the whiteness index while changing portions to be irradiated with light at least three times or more, preferably five times or more.

A method for measuring the "difference in WI standard deviation between outermost layers" in an embodiment of the present invention can be, for example, the following method.

(1): A standard deviation of the whiteness index of one outermost layer of a laminated separator is calculated with the foregoing method. (2): Then, the laminated separator is turned upside down such that the other outermost layer comes upward, and a standard deviation of the whiteness index of this other outermost layer is calculated by a process similar to that of (1) above. (3): Based on the standard deviations of the whiteness index calculated in the above (1) and (2), a "difference in WI standard deviation between outermost layers" is calculated.

(2. Nonaqueous Electrolyte Secondary Battery Porous Layer)

The porous layer in accordance with an embodiment of the present invention is stacked on one surface or both surfaces of a porous film as a constituent member included in a nonaqueous electrolyte secondary battery, and is provided between the porous film and a positive electrode or between the porous film and a negative electrode. Preferably, the porous layer is provided so as to make contact with at least one of the positive electrode and the negative electrode. There can be a single porous layer or two or more porous layers between the porous film and at least one of the positive electrode and the negative electrode.

The porous layer is preferably stacked on a surface of the porous film which surface faces the positive electrode. The porous layer is more preferably stacked so as to make contact with the positive electrode. The porous layer is preferably an insulating porous layer.

The porous layer in accordance with an embodiment of the present invention has a structure in which many pores, connected to one another, are provided, so that the porous layer is a layer through which a gas or a liquid can pass from one surface to the other. Further, in the laminated separator in accordance with an embodiment of the present invention, the porous layer can be a layer which serves as an outermost layer of the laminated separator and comes into contact with an electrode.

The porous layer in accordance with an embodiment of the present invention is typically a resin layer containing a resin. It is preferable that the resin is insoluble in the electrolyte of the battery and is electrochemically stable when the battery is in normal use.

Examples of the resin used in the porous layer in accordance with an embodiment of the present invention include polyolefins; (meth)acrylate resins; fluorine-containing resins; polyamide resins; polyimide resins; polyester resins; rubbers; resins having a melting point or glass transition temperature of not lower than 180° C.; water-soluble polymers; polycarbonate, polyacetal, and polyether ether ketone.

Among the above resins, polyolefins, (meth)acrylate resins, fluorine-containing resins, polyamide resins, polyester resins and water-soluble polymers are preferable.

The polyolefins are preferably polyethylene, polypropylene, polybutene, an ethylene/propylene copolymer, and the like.

Examples of the fluorine-containing resins encompass polyvinylidene fluoride, polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene/tetrafluoroethylene copolymer, and an ethylene/tetrafluoroethylene copolymer. Particular examples of the fluorine-containing resins encompass fluorine-containing rubber having a glass transition temperature of not higher than 23° C.

As the polyamide resins, aramid resins such as aromatic polyamide and wholly aromatic polyamide are preferable.

Specific examples of the aramid resins include poly (paraphenylene terephthalamide), poly(metaphenylene isophthalamide), poly(metaphenylene terephthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly (metaphenylene-2,6-naphthalene dicarboxylic acid amide), poly(2-chloroparaphenylene terephthalamide), a paraphenylene terephthalamide/metaphenylene terephthalamide copolymer, a paraphenylene terephthalamide/2,6-dichloroparaphenylene terephthalamide copolymer, and a metaphenylene terephthalamide/2,6-dichloroparaphenylene terephthalamide copolymer. Among these, poly(paraphenylene terephthalamide), poly(metaphenylene terephthalamide), and the paraphenylene terephthalamide/metaphenylene terephthalamide copolymer are preferable.

The polyester resins are preferably aromatic polyesters such as polyarylates, and liquid crystal polyesters.

Examples of the rubbers include a styrene/butadiene copolymer and a hydride thereof, a methacrylate ester copolymer, an acrylonitrile/acrylic ester copolymer, a styrene/acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, polymethacrylic acid, and sodium carboxymethylcellulose.

Each of these resins contained in the porous layer can be used solely. Alternatively, two or more of these resins contained in the porous layer can be used in combination.

The porous layer in accordance with an embodiment of the present invention can contain particles. In a case where the porous layer in accordance with an embodiment of the present invention contains particles, the resin is to have a function of a binder resin. The particles are organic particles or inorganic particles which are generally referred to as a filler.

Specific examples of organic substances constituting the organic filler contained in the porous layer in accordance with an embodiment of the present invention include (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride/propylene hexafluoride copolymer, a tetrafluoroethylene/ethylene copolymer, and polyvinylidene fluoride; a melamine resin; a urea resin; polyethylene; polypropylene; polyacrylic acid and polymethacrylic acid; a resorcinol resin; and the like. The organic filler can contain a single kind of organic substance or contain two or more kinds of organic substances.

The resorcinol resin can be, specifically, resorcin (resorcinol), and a polymer obtained by polymerizing resorcin and an aldehyde monomer. The aldehyde monomer can be any aldehyde. Examples of the aldehyde monomer include formaldehyde, acetaldehyde, propionaldehyde, benzaldehyde, furfural, thiophene carboxaldehyde, and the like. The aldehyde monomer is preferably formaldehyde. A formaldehyde monomer can be prepared from trioxane (which is a trimer of formaldehyde) or paraformaldehyde (which is a multimer of formaldehyde) in polymerization reaction of resorcin and the formaldehyde monomer. A single kind of aldehyde monomer or a mixture of two or more kinds of aldehyde monomers can be used.

The organic substance can be, other than the above examples, thermoplastic resins having a melting point or a glass transition temperature of not lower than 150° C., e.g., engineering plastics and super engineering plastics. The engineering plastics can be polycarbonate, polyacetal, modified polyphenylene ether, polybutylene terephthalate, and the like. The super engineering plastics can be polyphenyl sulfide, polyallylate, polysulfone, polyether ether ketone, polyetherimide, a liquid crystal polymer, polyimide, and the like.

Specific examples of the inorganic filler contained in the porous layer in accordance with an embodiment of the present invention include fillers each made of an inorganic substance such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. Among these, alumina, boehmite, aluminum hydroxide, magnesium hydroxide, magnesium oxide, titanium oxide, and silica are preferable. The inorganic filler can be (i) only one kind of filler or (ii) two or more kinds of fillers in combination.

An average particle diameter (D50) of the filler is preferably 0.001 µm or more, more preferably 0.01 µm or more, further preferably 0.05 µm or more. The average particle diameter (D50) is preferably 10 µm or less, more preferably 8 µm or less, further preferably 5 µm or less. An average particle diameter (D50) of the filler is preferably 0.001 µm or more and 10 µm or less, more preferably 0.01 µm or more and 8 µm or less, further preferably 0.05 µm or more and 5 µm or less. The average particle diameter of the filler is a value measured with use of MICROTRAC (MODEL: MT-3300EXII) available from NIKKISO CO., LTD.

A shape of the filler varies depending on a method for producing a raw material, i.e., an organic substance or an inorganic substance, a dispersion condition of the filler in preparing a coating liquid for forming the porous layer, and the like. Accordingly, the shape of the filler can be any of various shapes including (i) a shape such as a spherical shape, an oval shape, a rectangular shape, a gourd-like shape and (ii) an indefinite shape having no specific shape.

In a case where the porous layer contains a filler and an amount of the porous layer containing the filler is assumed as 100% by volume, a contained amount of the filler is preferably 40% by volume to 99% by volume, more preferably 45% by volume to 95% by volume. In a case where the contained amount of the filler falls within the above range, it is less likely that a void, which is formed when the fillers come into contact with each other, is blocked by the resin or the like, and this makes it possible to obtain sufficient ion permeability. Furthermore, the contained amount falling within the above range also makes it possible to set a weight per unit area to an appropriate value.

The porous layer can contain two or more kinds of particles in combination which two or more kinds differ from each other in particle diameter or in specific surface area.

The porous layer in accordance with an embodiment of the present invention preferably contains a heat-resistant filler. Here, "heat resistance" means that a melting point is not lower than 150° C. The heat-resistant filler can be one kind of heat-resistant filler or can be a combination of two or more kinds of heat-resistant fillers. The heat-resistant filler is preferably the above described inorganic filler, a heat-resistant organic filler, or a mixture thereof. The heat-resistant filler preferably contains the above described inorganic filler.

The heat-resistant organic filler is preferably a thermosetting resin filler, a heat-resistant thermoplastic resin filler, or a mixture thereof.

A resin constituting the heat-resistant organic filler is preferably the above described aramid resin or the above described resorcinol resin. The aramid resin is preferably poly(paraphenylene terephthalamide), poly(metaphenylene terephthalamide), or the paraphenylene terephthalamide/metaphenylene terephthalamide copolymer.

The porous layer in accordance with an embodiment of the present invention can contain the other component different from the resin and the filler. Examples of that other component include a surfactant, a viscosity modifier, a wax, and the like. A content of that other component is preferably 0% by weight to 10% by weight with respect to the total weight of the porous layer.

A thickness of the porous layer in accordance with an embodiment of the present invention is preferably 5 µm or less per layer, more preferably 4 µm or less per layer, from the viewpoint of preventing a deterioration in battery characteristic. The thickness of the porous layer is preferably 0.5 µm or more per layer, more preferably 1 µm or more per layer, from the viewpoint of sufficiently preventing internal short circuit caused due to breakage of the battery or the like and of preventing a decrease in retained amount of the electrolyte.

In view of ion permeability, the porous layer in accordance with an embodiment of the present invention preferably has a sufficiently porous structure. Specifically, the porous layer preferably has a porosity of 30% to 60%.

The porosity can be calculated by, for example, the following formula (1), where (i) W is a weight (g) of a porous layer having a certain volume (8 cm×8 cm×d (cm) (d: thickness)), (ii) d is the thickness (µm) of the porous layer, and (iii) p is an absolute specific gravity (g/cm³) of the porous layer:

$$\text{Porosity } (\%) = (1 - \{(W/\rho/(8 \times 8 \times d)\}) \times 100 \quad (1)$$

The porous layer in accordance with an embodiment of the present invention preferably has an average pore diameter which falls within a range from 20 nm to 100 nm, from the viewpoint of ion permeability and of preventing particles from intruding into the positive electrode and the negative electrode.

The average pore diameter can be calculated by, for example, (i) observing the porous layer in accordance with an embodiment of the present invention from an upper surface with use of a scanning electron microscope (SEM), (ii) measuring respective pore diameters of a plurality of holes randomly selected, and (iii) obtaining an average value of the pore diameters thus measured.

A weight per unit area of the porous layer in accordance with an embodiment of the present invention is preferably 0.5 g/m² to 10 g/m², more preferably 0.5 g/m² to 5 g/m² per layer of the porous layer in view of strength, thickness, weight, and handleability of the porous layer. According to an embodiment of the present invention, in a case where the porous layer is the outermost layer, as early described, a weight per unit area of the porous layer (outermost layer) correlates with the whiteness index value of this outermost layer. From the viewpoint of controlling the whiteness index value to a suitable range, the weight per unit area of the porous layer in accordance with an embodiment of the present invention is preferably 0.5 g/m² to 4.6 g/m², more preferably 1.4 g/m² to 4.6 g/m².

(3. Method for Producing Porous Layer)

A method for producing the porous layer in accordance with an embodiment of the present invention can be, for example, a method which includes a process (1) below and in which a porous layer is formed on a base material. A coating liquid in the process (1) below typically contains the above described resin and, if needed, can contain the above described particles, as components constituting the porous layer in accordance with an embodiment of the present invention. In the coating liquid used in the process (1), the particles can be dispersed and the resin can be dissolved. Examples of the base material encompass a positive electrode, a negative electrode, and a polyolefin porous film which serves as a base material of the nonaqueous electrolyte secondary battery laminated separator in accordance with an embodiment of the present invention. The solvent can be regarded as a solvent in which the resin is dissolved and as a dispersion medium in which the resin or the particles are dispersed.

(1) A process in which (i) a base material is coated with a coating liquid, and then (ii) the base material is dried for removal of a solvent from the coating liquid, so that the porous layer is formed.

The solvent for the coating liquid is preferably a solvent that does not adversely affect the base material, that allows the resin to be dissolved or dispersed therein uniformly and stably, and that allows the particles to be dispersed therein uniformly and stably. Examples of the solvent include N-methylpyrrolidone, N,N-dimethylacetamide, N,N-dimethylformamide, acetone, alcohols, water, and a mixed solvent containing two or more of these.

In a case where a preferable production method is employed in the method for producing the porous layer in accordance with an embodiment of the present invention, it is possible to control uniformity of internal structure and the like of the porous layer, and it is consequently possible to adjust the standard deviation of the whiteness index of the nonaqueous electrolyte secondary battery porous layer in accordance with an embodiment of the present invention to the suitable range.

The preferable production method can be a method in which steam at a temperature of 53° C. to 57° C. is blown toward the coating liquid coating the base material at a blowing rate of 50 m³/min to 80 m³/min during an early stage of drying and removing the solvent in the coating liquid coating the base material, that is, for 10 seconds, preferably 8 seconds from when the drying and removing of the solvent started.

(4. Polyolefin Porous Film)

The polyolefin porous film in accordance with an embodiment of the present invention includes polyolefin as a main component. The polyolefin porous film has therein many pores, connected to one another, so that a gas and a liquid can pass through the polyolefin porous film from one side to the other side. The porous film serves as a base material on which the porous layer is stacked in the laminated separator in accordance with an embodiment of the present invention.

The laminated separator in accordance with an embodiment of the present invention can include, in addition to the porous film and the porous layer, other layer(s) such as an adhesive layer, a heat-resistant layer, and/or a protective layer.

The porous film contains a polyolefin at a proportion of not less than 50% by volume, preferably not less than 90% by volume, more preferably not less than 95% by volume, relative to the entire porous film. The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because such a polyolefin allows the nonaqueous electrolyte secondary battery separator to have a higher strength.

Specific examples of the polyolefin (thermoplastic resin) include a homopolymer or a copolymer each produced by polymerizing a monomer such as ethylene, propylene, 1-butene, 4-methyl-1-pentene, or 1-hexene. Examples of the homopolymer include polyethylene, polypropylene, and polybutene. Examples of the copolymer include an ethylene/propylene copolymer.

Among the above examples, polyethylene is more preferable as it is capable of preventing a flow of an excessively large electric current at a lower temperature. The prevention of an excessively large electric current is also referred to as shutdown. Examples of the polyethylene include low-density polyethylene, high-density polyethylene, linear polyethylene (ethylene/α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a film thickness of preferably 4 μm to 40 μm, more preferably 5 μm to 30 μm, still more preferably 6 μm to 15 μm.

The porous film can have a weight per unit area which weight is appropriately determined in view of the strength, film thickness, weight, and handleability. The weight per unit area is, however, within a range of preferably 4 g/m² to 15 g/m², more preferably 4 g/m² to 12 g/m², even more preferably 5 g/m² to 10 g/m², so as to allow a nonaqueous electrolyte secondary battery to have a higher weight energy density and a higher volume energy density.

The porous film has an air permeability of preferably 30 sec/100 mL to 500 sec/100 mL, more preferably 50 sec/100 mL to 300 sec/100 mL, in terms of Gurley values. A porous film having an air permeability within the above range can have sufficient ion permeability. A laminated separator in which the porous layer described above is provided on a porous film has an air permeability of preferably 30 sec/100 mL to 1000 sec/100 mL, more preferably 50 sec/100 mL to 800 sec/100 mL in terms of Gurley values. The laminated separator, which has the above air permeability, allows the nonaqueous electrolyte secondary battery to have sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing a flow of an excessively large electric current at a lower temperature. Further, in order to obtain sufficient ion permeability and prevent particles from entering the positive electrode and/or the negative electrode, the porous film has pores each having a pore diameter of preferably not larger than 0.30 μm, more preferably not larger than 0.14 μm, even more preferably not larger than 0.10 μm.

(5. Method for Producing Polyolefin Porous Film)

The method for producing the polyolefin porous film is not limited to any particular one. For example, the method can include the following steps:

(A) Obtaining a polyolefin resin composition by kneading ultra-high molecular weight polyethylene, low molecular weight polyethylene having a weight-average molecular weight of not more than 10,000, a pore forming agent (such as calcium carbonate or plasticizer), and an antioxidant;

(B) Forming a sheet by rolling the obtained polyolefin resin composition with use of a pair of rollers, and gradually cooling the polyolefin resin composition while pulling the polyolefin resin composition with use of a winding roller rotating at a rate different from that of the pair of rollers;

(C) Removing the pore forming agent from the obtained sheet with use of an appropriate solvent; and (D) Stretching, at an appropriate stretch magnification, the sheet from which the pore forming agent has been removed.

In a case where a preferable production method is employed in the method for producing the porous film in accordance with an embodiment of the present invention, it is possible to control uniformity of internal structure and the like of the porous film. Consequently, in a case where the porous film in accordance with an embodiment of the present invention serves as the outermost layer, it is possible to adjust the standard deviation of the whiteness index of the outermost layer to the suitable range.

The above preferable production method can be, for example, a process of adjusting production conditions so that a weight per unit area of an obtained porous film falls within the preferable range described in (4. Polyolefin porous film) above. Specifically, it is possible to employ, in the above process (A), a process of using a pore forming agent which (i) has a particle size distribution that has a single peak and is not sharp and (ii) has a peak in a region in which a particle size is smaller than 0.01 μm.

(6. Method for Producing Nonaqueous Electrolyte Secondary Battery Laminated Separator)

A method for producing the nonaqueous electrolyte secondary battery laminated separator in accordance with an embodiment of the present invention can be, for example, the above-described method of (3. Method for producing porous layer) in which the above-described polyolefin porous film is used as a base material which is coated with the coating liquid.

In a case where the standard deviation of the whiteness index of the outermost layer (for example, the porous layer and the porous film) of the nonaqueous electrolyte secondary battery laminated separator in accordance with an embodiment of the present invention is adjusted with the foregoing method, it is possible to control a greater one of standard deviations of the whiteness index in the outermost layers and the "difference in WI standard deviation between outermost layers" to fall within respective suitable ranges in the nonaqueous electrolyte secondary battery laminated separator in accordance with an embodiment of the present invention.

Embodiment 2: Nonaqueous Electrolyte Secondary Battery

A nonaqueous electrolyte secondary battery in accordance with an embodiment of the present invention includes the nonaqueous electrolyte secondary battery laminated separator in accordance with an embodiment of the present invention.

The nonaqueous electrolyte secondary battery in accordance with an embodiment of the present invention can be, for example, a nonaqueous secondary battery that achieves an electromotive force through doping with and dedoping of lithium, and can be a lithium-ion secondary battery that includes a member for a nonaqueous electrolyte secondary battery (hereinafter referred to as a "nonaqueous electrolyte secondary battery member") including a positive electrode, a porous layer in accordance with an embodiment of the present invention, a porous film, and a negative electrode, which are stacked in this order, that is, a nonaqueous electrolyte secondary battery member including a positive electrode, a nonaqueous electrolyte secondary battery laminated separator in accordance with an embodiment of the present invention, and a negative electrode, which are stacked in this order. Note that constituent elements, other than the nonaqueous electrolyte secondary battery laminated separator, of the nonaqueous electrolyte secondary battery are not limited to those described below.

The nonaqueous electrolyte secondary battery in accordance with an embodiment of the present invention is typically configured so that a battery element is enclosed in an exterior member, the battery element including (i) a structure in which the negative electrode and the positive electrode face each other through the nonaqueous electrolyte secondary battery laminated separator in accordance with an embodiment of the present invention and (ii) an electrolyte with which the structure is impregnated. The nonaqueous electrolyte secondary battery in accordance with an embodiment of the present invention is preferably a secondary battery including a nonaqueous electrolyte, and is particularly preferably a lithium-ion secondary battery.

The nonaqueous electrolyte secondary battery in accordance with an embodiment of the present invention includes the nonaqueous electrolyte secondary battery laminated separator in accordance with an embodiment of the present invention, and therefore brings about an effect of having an excellent long-term battery characteristic.

<Positive Electrode>

Examples of a positive electrode included in the nonaqueous electrolyte secondary battery in accordance with an embodiment of the present invention encompass a positive electrode sheet having a structure in which an active material layer including a positive electrode active material and a binding agent is formed on a current collector. The active material layer can further contain an electrically conductive agent.

The positive electrode active material is, for example, a material capable of being doped with and dedoped of lithium ions. Examples of such a material encompass a lithium complex oxide containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass: thermoplastic resins such as polyvinylidene fluoride, a copolymer of vinylidene fluoride, polytetrafluoroethylene, a vinylidene fluoride/hexafluoropropylene copolymer, a tetrafluoroethylene/hexafluoropropylene copolymer, a tetrafluoroethylene/perfluoroalkyl vinyl ether copolymer, an ethylene/tetrafluoroethylene copolymer, a vinylidene fluoride/tetrafluoroethylene copolymer, a vinylidene fluoride/trifluoroethylene copolymer, a vinylidene fluoride/trichloroethylene copolymer, a vinylidene fluoride/vinyl fluoride copolymer, a vinylidene fluoride/hexafluoropropylene/tetrafluoroethylene copolymer, a thermoplastic polyimide, polyethylene, and polypropylene; acrylic resin; and styrene butadiene rubber. Note that the binding agent also serves as a thickener.

The positive electrode mix can be prepared by, for example, a method of applying pressure to the positive electrode active material, the electrically conductive agent, and the binding agent on the positive electrode current collector or a method of using an appropriate organic solvent so that the positive electrode active material, the electrically conductive agent, and the binding agent are made into a paste form.

Examples of the positive electrode current collector encompass electric conductors such as Al, Ni, and stainless steel. Among these, Al is preferable because Al is easily processed into a thin film and is inexpensive.

The positive electrode sheet can be produced, that is, the positive electrode mix can be supported by the positive electrode current collector by, for example, a method in which pressure is applied to the positive electrode active material, the electrically conductive agent, and the binding agent on the positive electrode current collector to form a positive electrode mix thereon.

<Negative Electrode>

Examples of a negative electrode included in the non-aqueous electrolyte secondary battery in accordance with an embodiment of the present invention encompass a negative electrode sheet having a structure in which an active material layer including a negative electrode active material and a binding agent is formed on a current collector. The active material layer can further contain an electrically conductive agent.

Examples of the negative electrode active material encompass (i) a material capable of being doped with and dedoped of lithium ions, (ii) a lithium metal, and (iii) a lithium alloy. Specific examples of the material encompass: (1) carbonaceous materials such as natural graphite, artificial graphite, cokes, carbon black, pyrolytic carbons, carbon fiber, and a fired product of an organic polymer compound; (2) chalcogen compounds such as an oxide and a sulfide that are doped with and dedoped of lithium ions at an electric potential lower than that for the positive electrode; (3) metals such as aluminum (Al), lead (Pb), tin (Sn), bismuth (Bi), or silicon (Si), each of which is alloyed with alkali metal; (4) an intermetallic compound (AlSb, $Mg_2Si$, $NiSi_2$) of a cubic system in which intermetallic compound alkali metal can be inserted in voids in a lattice; and (5) lithium nitrogen compounds ($Li_{3-x}M_xN$ (where M represents a transition metal)).

The negative electrode mix can be prepared by, for example, a method in which pressure is applied to the negative electrode active material on a negative electrode current collector or a method in which an appropriate organic solvent is used so that the negative electrode active material is made into a paste form.

Examples of the negative electrode current collector encompass electric conductors such as Cu, Ni, and stainless steel.

The negative electrode sheet can be produced, that is, the negative electrode mix can be supported by the negative electrode current collector by, for example, a method in which pressure is applied to the negative electrode active material on the negative electrode current collector to form a negative electrode mix thereon. The above paste preferably includes the above electrically conductive agent and the above binding agent.

<Nonaqueous Electrolyte>

A nonaqueous electrolyte for use in the nonaqueous electrolyte secondary battery in accordance with an embodiment of the present invention is a nonaqueous electrolyte generally used in a nonaqueous electrolyte secondary battery, and is not limited to any particular one. Examples of the nonaqueous electrolyte encompass a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Specific examples of the organic solvent in the nonaqueous electrolyte for the present invention include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvents described above. It is possible to use only one kind of the above organic solvents or two or more kinds of the above organic solvents in combination.

<Method for Producing Nonaqueous Electrolyte Secondary Battery>

A nonaqueous electrolyte secondary battery in accordance with an embodiment of the present invention can be produced by, for example, (i) producing a nonaqueous electrolyte secondary battery member by providing the positive electrode, the nonaqueous electrolyte secondary battery laminated separator in accordance with an embodiment of the present invention, and a negative electrode in this order, then (ii) inserting the nonaqueous electrolyte secondary battery member into a container that will serve as a housing of a nonaqueous electrolyte secondary battery, then (iii) filling the container with a nonaqueous electrolyte, and then (iv) hermetically sealing the container while reducing pressure inside the container.

The nonaqueous electrolyte secondary battery is not particularly limited in shape and can have any shape such as the shape of a thin plate (sheet), a disk, a cylinder, or a prism such as a cuboid. The nonaqueous electrolyte secondary battery member and the nonaqueous electrolyte secondary battery can each be produced by any method, and can each be produced by a conventionally publicly known method.

The present invention is not limited to the embodiments, but can be altered variously by a skilled person in the art within the scope of the claims. The present invention also encompasses, in its technical scope, any embodiment derived by appropriately combining technical means disclosed in differing embodiments. Further, it is possible to form a new technical feature by combining the technical means disclosed in the respective embodiments.

EXAMPLES

The following description will discuss the present invention in further detail with reference to Examples and Comparative Examples. Note, however, that the present invention is not limited to those Examples.

In each of Examples and Comparative Examples, physical properties and the like of a nonaqueous electrolyte secondary battery laminated separator, a layer A (polyolefin porous film), a layer B (porous layer), and a nonaqueous electrolyte secondary battery were measured by the following methods.

(1) Film Thickness (Unit: μm):

A thickness of the nonaqueous electrolyte secondary battery laminated separator (i.e., a total film thickness), a thickness of the layer A, and a thickness of the layer B were each measured with use of a high-precision digital length measuring machine available from Mitutoyo Corporation.

(2) Weight Per Unit Area (Unit: g/m$^2$):

A sample in the form of a 6.4 cm×4 cm rectangle was cut out from the nonaqueous electrolyte secondary battery laminated separator, and the weight W (g) of the sample was measured. Then, the weight per unit area of the nonaqueous electrolyte secondary battery laminated separator was calculated in accordance with the following formula:

Weight per unit area (g/m$^2$)=$W$/(0.064×0.04)

The weight per unit area of the layer A was calculated in a similar manner. The weight per unit area of the layer B was calculated by subtracting the weight per unit area of the layer A from the weight per unit area of the nonaqueous electrolyte secondary battery laminated separator.

(3) Average Particle Diameter (D50), Particle Size Distribution (Unit: μm):

The average particle diameter and the particle size distribution of the filler were measured with use of MICROTRAC (MODEL: MT-3300EXII) available from NIKKISO CO., LTD.

(4) Measurement of Whiteness Index (WI):

Zero calibration and white calibration were carried out under the following conditions with use of a spectrophotometric colorimeter (CM-2500d, available from KONICA MINOLTA). As an underlay, black paper (available from Hokuetsu Kishu Paper Co., Ltd., colored high-quality paper, black, thickest type, shirokuhan (788 mm×1091 mm with the long side extending in a machine direction)) was placed on an experiment base, and a single sheet of the nonaqueous electrolyte secondary battery laminated separator was placed on the black paper such that a front surface of the layer B faces upward. Then, WI of the layer B was measured. Note that, for a nonaqueous electrolyte secondary battery laminated separator (3) below, WI of an aramid layer (i) was measured.

Subsequently, the nonaqueous electrolyte secondary battery laminated separator was turned upside down and placed on the black paper, and WI of the other surface (layer A or aramid layer (ii)) was measured with a similar process.

(Conditions for Measuring WI)

Measurement area: inner diameter of 8 mm
Measurement: specular component included (SCI)
UV: 100% (UV component included)
Light source 1: D65 (daylight color, color temperature of 6504 k)
Observer: 10° (CIE1964)
Displayed data: WI ASTE E313 whiteness
Manual averaging: 3 (number of times)
Standard deviation: SCI 0.20
Auto averaging: 3 (number of times)
Measuring time: 0.0 s Example 1

[Production Example of Aramid Polymerization Liquid]

With use of a 3-liter separable flask having a stirring blade, a thermometer, a nitrogen incurrent canal, and a powder addition port, poly(paraphenylene terephthalamide) was produced.

The flask was sufficiently dried, 2200 g of N-methyl-2-pyrrolidone (NMP) was put in the flask, and 151.07 g of calcium chloride powder that had been vacuum-dried at 200° C. for 2 hours was added to the NMP and then completely dissolved in the NMP while a temperature of a mixture of the NMP and the calcium chloride powder was raised to 100° C. The temperature of a resultant solution was brought down to a room temperature, and 68.23 g of paraphenylenediamine was added to and completely dissolved in a resultant mixture. While a temperature of a resultant solution was maintained at 20° C.±2° C. and a dissolved oxygen concentration in polymerization was maintained at 0.5%, 124.97 g of dichloride terephthalate, which was separated into 10 pieces, was one-by-one added to the solution at approximately 5-minute intervals. After that, a resultant solution was ripened for 1 hour while being stirred and maintained at 20° C.±2° C. Then, the solution thus ripened was filtered through 1500-mesh stainless steel gauze. The solution thus obtained was a para-aramid solution having a para-aramid concentration of 6%.

<Layer A>

A porous film serving as a base material was prepared with use of polyethylene which is polyolefin.

That is, 70 parts by weight of an ultra-high molecular weight polyethylene powder (340M, available from Mitsui Chemicals, Inc.) and 30 parts by weight of a polyethylene wax (FNP-0115, available from Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, available from Ciba Specialty Chemicals Inc.), 0.1 parts by weight of an antioxidant (P168, available from Ciba Specialty Chemicals Inc.), and 1.3 parts by weight of sodium stearate were added. Then, calcium carbonate having a broad peak in a region of an average particle diameter of less than 0.01 μm was further added so that the calcium carbonate accounted for 38% by volume of the total volume. Note that the calcium carbonate was prepared by pulverizing calcium carbonate (available from Maruo Calcium Co., Ltd.) having an average particle diameter of 0.1 μm in advance with use of a ball mill. Then, the above composition in powder form was mixed with use of a Henschel mixer, and was then melted and kneaded by a twin screw kneading extruder. This produced a polyethylene resin composition.

Next, the polyethylene resin composition was rolled with use of a pair of rollers each having a surface temperature of 150° C., so that a sheet was prepared. This sheet was immersed in an aqueous hydrochloric acid solution (containing 4 mol/L of hydrochloric acid and 0.5% by weight of nonionic surfactant) to dissolve the calcium carbonate for removal of the calcium carbonate from the sheet. Subsequently, the sheet was stretched at a stretching temperature of 105° C. and a stretching magnification of 6 times, and thus a porous film (layer A) made of polyethylene was prepared.

<Layer B>

The para-aramid solution obtained in the above production example of aramid polymerization liquid was weighed by 100 g and put in a flask. Then, 300 g of NMP was added to the solution. Thus, a para-aramid solution having a para-aramid concentration of 1.5% by weight was prepared, and the solution thus prepared was stirred for 60 minutes. Subsequently, 6 g of alumina C (available from NIPPON AEROSIL CO., LTD.) was mixed with the solution, and a resultant solution was stirred for 240 minutes. A resultant solution was filtered with a 1000-mesh metal gauze, and then 0.73 g of calcium carbonate was added and stirred for 240 minutes for neutralization. A resultant mixture was then defoamed under reduced pressure, and thus a coating liquid (1) in the form of slurry was prepared.

The polyethylene porous film (layer A) having a film thickness of 10 μm was coated with the coating liquid (1) with use of a coating bar. The coating liquid (1) was dried to deposit a para-aramid resin contained in the coating liquid (1), and thus a coating film was formed on the layer A. For several seconds in the early stage of the drying, steam at a temperature of 55° C. was blown at a blowing rate of 50 m³/min onto the surface of the layer A coated with the coating liquid (1). Next, the coating film was cleaned with water and dried to form a heat-resistant porous layer on the layer A, and thus a laminated separator was obtained. The laminated separator thus obtained is herein referred to as a nonaqueous electrolyte secondary battery laminated separator (1).

Example 2

A laminated separator was obtained in a manner similar to that of Example 1, except that a clearance in coating the layer A with the coating liquid (1) with use of the coating bar was changed and a weight per unit area of an obtained heat-resistant porous layer (layer B) was changed to a value indicated in Table 1. The laminated separator thus obtained is herein referred to as a nonaqueous electrolyte secondary battery laminated separator (2). Note that the clearance means a size of a gap between the layer A and the coating bar.

Example 3

(1) Preparation of Coating Liquid 2 (Aramid Coating Liquid)

To 5000 g of an NMP/calcium chloride solution (calcium chloride concentration=7.1% by weight), 150.00 g of para-phenylenediamine (hereinafter, referred to as "PPD") was added and stirred in a nitrogen atmosphere to dissolve the PPD, and thus a PPD solution was obtained. Then, to the PPD solution thus obtained, 273.94 g of dichloride tereph-thalate (hereinafter, referred to as "TPC") was added and stirred at 15° C. to cause reaction for one hour, and thus a polyparaphenylene terephthalamide solution was obtained.

The solution was taken in an amount of 1000 g and, to the solution, 3000 g of NMP, 23.4 g of calcium carbonate (available from Ube Material Industries, Ltd.), 60 g of particles (a) (fine powdery alumina (available from NIPPON AEROSIL CO., LTD., alumina C (ALC), average particle size: 0.013 μm)), and 60 g of particles (b) (alumina powder (available from Sumitomo Chemical Company, Limited, Sumicorandom AA03, average particle size: 0.3 μm)) were added. After mixing by stirring, a dispersing process was carried out once under pressure of 50 MPa with use of a Gaulin homogenizer (available from APV), and thus an aramid coating liquid having a solid content concentration of 4.35% by weight was obtained. In the solid content, a weight ratio of aramid:particles (a):particles (b) was 1:1:1. The aramid coating liquid thus obtained is herein referred to as a coating liquid (2).

(2) Coating of Surface of Layer A with Aramid Layer

As a layer A, the porous film (layer A) described in Example 1 was used. One surface of the porous film (layer A) was coated with the coating liquid (2), which was an aramid coating liquid. After the coating, the coating liquid (2) was dried to deposit an aramid resin contained in the coating liquid (2), and thus a laminated body was obtained in which an aramid layer (i) was stacked on a first surface (i.e., one surface) of the layer A. For several seconds in the early stage of the drying, steam at a temperature of 55° C. was blown at a blowing rate of 50 m³/min onto the surface of the layer A coated with the coating liquid (2).

Next, a second surface (i.e., the other surface) of the layer A was similarly coated with the coating liquid (2). After the coating, the coating liquid (2) was dried to stack an aramid layer (ii) on the second surface.

Through the above process, a laminated porous film (3) in which the aramid layer (i), the layer A, and the aramid layer (ii) were stacked in this order was obtained as a nonaqueous electrolyte secondary battery laminated separator (3).

Example 4

A nonaqueous electrolyte secondary battery laminated separator (4) was produced with use of a layer A and a layer B below.

<Layer A>

As a layer A, a porous film which was obtained by the method described in Example 1 and had a thickness of 12 μm was used.

<Layer B>

Under a room temperature, 154.15 g of resorcin and 340.89 g of a 37% aqueous formaldehyde solution were put into a 2-L separable flask in which air had been replaced with nitrogen so that a molar ratio of resorcin and formaldehyde became 1:3. Further, 1541.5 g of water and 0.0786 g of sodium carbonate were added. A dispersion state was made uniform by stirring and then a temperature was raised to 80° C. The mixture was kept at 80° C. for 24 hours to carry out polymerization reaction, and thus a suspension containing particles of a resorcin-formalin resin (RF resin) was obtained.

After radiational cooling, the suspension thus obtained was centrifuged, so that the particles of the RF resin precipitated. Then, a supernatant dispersion medium was removed while the precipitated particles of the RF resin were left. Then, the RF resin was cleaned by carrying out twice a cleaning operation including (i) adding water which served as a cleaning liquid, (ii) stirring a resulting mixture, and (iii) centrifuging the mixture so as to remove the cleaning liquid. Particles of the cleaned RF resin were dried, and an organic filler (1) (D50: 1.0 μm) was quantitatively synthesized. As a resin contained in the porous layer, sodium carboxymethylcellulose (CMC) (available from DAICEL CORPORATION; CMC1110) was used.

As a solvent, a mixed solvent containing water and isopropyl alcohol (water:isopropyl alcohol=95% by weight: 5% by weight) was used.

The organic filler (1), CMC, and the solvent were mixed so that a solid concentration (i.e., a concentration of the organic filler (1) and CMC) became 20.0% by weight and a weight ratio of the organic filler (1):CMC became 100:8, and thus a dispersion liquid containing the organic filler (1) was obtained. The dispersion liquid thus obtained was dispersed by high pressure (high-pressure dispersion conditions: 100 MPa×3 passes) with use of a high-pressure dispersing device (available from Sugino Machine Limited; Star Burst), so that a coating liquid was prepared. The coating liquid thus prepared is herein referred to as a coating liquid (3).

<Nonaqueous Electrolyte Secondary Battery Laminated Separator>

One surface of the layer A was uniformly coated with the coating liquid (3) with use of a gravure coater. The coating liquid (3) was dried to deposit CMC contained in the coating liquid (3) so as to form a CMC layer. For several seconds in the early stage of the drying, steam at a temperature of 55° C. was blown at a blowing rate of 50 m$^3$/min onto the surface of the layer A coated with the coating liquid (3). Thus, a laminated separator was obtained in which the CMC layer (layer B) was stacked on a surface of the layer A. The laminated separator thus obtained is herein referred to as a nonaqueous electrolyte secondary battery laminated separator (4).

Example 5

A nonaqueous electrolyte secondary battery laminated separator (5) was produced with use of a layer A and a layer B below.

<Layer A>

A porous film similar to that of Example 4 was used.

<Layer B>

Under a room temperature, 154.15 g of resorcin and 170.45 g of a 37% aqueous formaldehyde solution were put into a 2-L separable flask in which air had been replaced with nitrogen so that a molar ratio of resorcin and formaldehyde became 1:1.5. Further, 1541.5 g of water and 0.0786 g of sodium carbonate were added. A dispersion state was made uniform by stirring and then a temperature was raised to 80° C. The mixture was kept at 80° C. for 24 hours to carry out polymerization reaction, and thus a suspension containing particles of a resorcin-formalin resin (RF resin) was obtained.

After radiational cooling, the suspension thus obtained was centrifuged, so that the particles of the RF resin precipitated. Then, a supernatant dispersion medium was removed while the precipitated particles of the RF resin were left. Then, the RF resin was cleaned by carrying out twice a cleaning operation including (i) adding water which served as a cleaning liquid, (ii) stirring a resulting mixture, and (iii) centrifuging the mixture so as to remove the cleaning liquid. Particles of the cleaned RF resin were dried, and an organic filler (2) (D50: 1.0 μm) was quantitatively synthesized. After that, a coating liquid was prepared in a manner similar to that of Example 4, except that the organic filler (2) was used instead of the organic filler (1). The coating liquid thus prepared is herein referred to as a coating liquid (4).

<Nonaqueous Electrolyte Secondary Battery Laminated Separator>

A laminated separator was obtained by an operation similar to that of Example 4, except that the coating liquid (4) was used instead of the coating liquid (3). The laminated separator thus obtained is herein referred to as a nonaqueous electrolyte secondary battery laminated separator (5).

Comparative Example 1

A nonaqueous electrolyte secondary battery laminated separator was prepared with use of a layer A and a layer B below.

<Layer A>

A polyethylene porous film (layer A) was prepared in a manner similar to that of Example 1.

<Layer B>

A coating liquid was prepared by carrying out an operation similar to that of Example 4, except that, as a filler, α alumina powder (available from Sumitomo Chemical Company, Limited, product name: Sumicorandom AA05) was used instead of the organic filler (1). The coating liquid thus prepared is herein referred to as a coating liquid (5).

<Nonaqueous Electrolyte Secondary Battery Laminated Separator>

One surface of the layer A was subjected to a corona treatment at 20 W/(m$^2$/min). Next, the surface of the layer A which has been subjected to the corona treatment was uniformly coated with the coating liquid (5) with use of a gravure coater, and thus a coating film was formed on the layer A. Then, the coating film thus formed was dried to deposit a porous layer (layer B) on the layer A. Thus, a laminated separator was obtained in which the layer B was stacked on one surface of the layer A. The laminated separator thus obtained is herein referred to as a nonaqueous electrolyte secondary battery laminated separator (6).

Comparative Example 2

A nonaqueous electrolyte secondary battery laminated separator was prepared with use of a layer A and a layer B below.

<Layer A>

A polyethylene porous film (layer A) was prepared in a manner similar to that of Example 1.

<Layer B and Nonaqueous Electrolyte Secondary Battery Laminated Separator>

A porous layer (layer B) was deposited on the layer A to obtain a laminated separator by carrying out an operation similar to that of Example 1, except that the coating liquid (2) prepared in Example 3 was used instead of the coating liquid (1) and, for several minutes in the early stage of the drying, steam at a temperature of 55° C. was blown at a blowing rate of 50 m$^3$/min onto a surface of the layer A coated with the coating liquid (2). The laminated separator thus obtained is herein referred to as a nonaqueous electrolyte secondary battery laminated separator (7).

<Physical Property Evaluation of Nonaqueous Electrolyte Secondary Battery Separator>

Physical properties and the like of the nonaqueous electrolyte secondary battery laminated separators (1) through (7) were measured with the above described methods. Table 1 shows the results. For Example 3, a thickness of the aramid layer (i) is indicated as "layer B thickness (i)" and a weight per unit area of the aramid layer (i) is indicated as "weight per unit area (i) in layer B", a thickness of the aramid layer (ii) is indicated as "layer B thickness (ii)", and a weight per unit area of the aramid layer (ii) is indicated as "weight per unit area (ii) in layer B".

<WI Standard Deviation and Difference in WI Standard Deviation Between Outermost Layers>

A plurality of different portions, which were arbitrarily selected, on each of two outermost layers of each of the nonaqueous electrolyte secondary battery laminated separators (1) through (7) were irradiated with light, and WI was measured two or more times. Specifically, the measurement was carried out three times. Based on the measured values of WI, a standard deviation of WI was calculated. Subsequently, an absolute value of a difference between the standard deviation of one outermost layer and the standard deviation of the other outermost layer was obtained, and thus the "difference in WI standard deviation between outermost layers" was calculated.

<Preparation of Electrodes>

(Preparation of Positive Electrode)

A mixture obtained by mixing 6 parts by weight of acetylene black and 4 parts by weight of polyvinylidene fluoride (available from KUREHA CORPORATION) with 90 parts by weight of $LiNi_{1/3}Mn_{1/3}Co_{1/3}O_2$ serving as a positive electrode active material was dispersed in N-methyl-2-pyrolidone, and thus a slurry was prepared. The slurry thus obtained was applied uniformly to a part of an aluminum foil serving as a positive electrode current collector and dried, and then rolled to have a thickness of 80 μm with a pressing machine.

Next, the aluminum foil thus rolled was cut so as to obtain a positive electrode that had (i) a first portion on which a positive electrode active material layer was formed and which had a size of 40 mm×35 mm and (ii) a second portion on which no positive electrode active material layer was formed, which had a width of 13 mm, and which remained on an outer periphery of the first portion. The positive electrode active material layer had a density of 2.50 $g/cm^3$.

(Preparation of Negative Electrode)

Graphite powder (serving as a negative electrode active material) in an amount of 98 parts by weight was mixed with 100 parts by weight of an aqueous solution containing carboxymethyl cellulose serving as a thickener and a binding agent (carboxymethyl cellulose concentration: 1% by weight) and with 1 part by weight of a water-based emulsion of styrene-butadiene rubber, and thus a slurry was prepared. The slurry thus obtained was applied to a part of a rolled copper foil, which served as a negative electrode current collector and had a thickness of 20 μm, and dried, and then rolled to have a thickness of 80 μm with a pressing machine.

Next, the rolled copper foil thus rolled was cut so as to obtain a negative electrode that had (i) a first portion on which a negative electrode active material layer was formed and which had a size of 50 mm×40 mm and (ii) a second portion on which no negative electrode active material layer was formed, which had a width of 13 mm, and which remained on an outer periphery of the first portion. The negative electrode active material layer had a density of 1.40 $g/cm^3$.

<Preparation of Nonaqueous Electrolyte Secondary Battery>

In a laminate pouch, the positive electrode, each of the nonaqueous electrolyte secondary battery laminated separators (1) through (7), and the negative electrode were stacked (arranged) in this order so that (i) the layer B of each of the nonaqueous electrolyte secondary battery laminated separators (1) through (7) and the positive electrode active material layer of the positive electrode come into contact with each other and (ii) the layer A of each of the nonaqueous electrolyte secondary battery laminated separators (1) through (7) and the negative electrode active material layer of the negative electrode come into contact with each other. This produced a nonaqueous electrolyte secondary battery member. In so doing, the positive electrode and the negative electrode were arranged so that a main surface of the positive electrode active material layer of the positive electrode was entirely included in a range of a main surface of the negative electrode active material layer of the negative electrode (i.e., entirely covered by the main surface of the negative electrode active material layer of the negative electrode).

Subsequently, the nonaqueous electrolyte secondary battery member was put into a bag made of a laminate of an aluminum layer and a heat seal layer. Further, 0.23 mL of nonaqueous electrolyte was put into the bag. The nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while pressure inside the bag was reduced, so that a nonaqueous electrolyte secondary battery was prepared. Nonaqueous electrolyte secondary batteries prepared with use of the respective nonaqueous electrolyte secondary battery laminated separators (1) through (7) are herein referred to as nonaqueous electrolyte secondary batteries (1) through (7).

<Charge Capacity Recovery Rate (%) Through Test for Evaluating Rate Characteristic>

For each of the nonaqueous electrolyte secondary batteries (1) through (7) which have not been subjected to a charge-discharge cycle, 100 cycles of charge and discharge were carried out at 55° C. under conditions of charge at 1 C and discharge at 10 C. Next, for each of the nonaqueous electrolyte secondary batteries (1) through (7), 3 cycles of charge and discharge were carried out at 25° C. for each rate. Each of the 3 cycles of charge and discharge was carried out (i) at a voltage ranging from 2.7 V to 4.2 V, (ii) with CC-CV charge at a charge current value of 1 C (where the terminal current condition is 0.02 C), and (iii) with CC discharge at discharge current values of 0.2 C (first time), 1 C, 5 C, 10 C, 20 C, and 0.2 C (second time). Note here that the "CC-CV charge" is a charging method in which (i) a battery is charged at a predetermined constant electric current and, (ii) after a certain voltage is reached, the certain voltage is maintained while the electric current is being reduced. The "CC discharge" is a discharging method in which a battery is discharged at a predetermined constant electric current until a certain voltage is reached.

Next, charging capacities at respective charge current values of 0.2 C (first time) and 0.2 C (second time) were measured, and a charge capacity recovery rate (%) through test for evaluating rate characteristic was calculated based on the following formula.

Charge capacity recovery rate (%) through test for evaluating rate characteristic=charging capacity in rate test at 0.2 C (second time)×100/charging capacity in rate test at 0.2 C (first time)

The above formula is synonymous with the following formula.

Charge capacity recovery rate (%) through test for evaluating rate characteristic=charging capacity at charge current value of 0.2 C (second time)× 100/charging capacity at charge current value of 0.2 C (first time)

CONCLUSION

TABLE 1

| | Layer A | Layer B | | Laminated separator |
|---|---|---|---|---|
| | Thickness [μm] | Thickness [μm] | Weight per unit area [g/m²] | Thickness [μm] |
| Example 1 | 10.3 | 2.2 | 1.4 | 12.5 |
| Example 2 | 10.3 | 2.7 | 1.7 | 13.0 |
| Example 3 | 10.3 | (i) 2.4 (ii) 1.8 | (i) 1.2 (ii) 0.9 | 14.5 |
| Example 4 | 12.0 | 2.4 | 2.4 | 14.4 |
| Example 5 | 12.0 | 6.1 | 4.6 | 18.1 |
| Com. Ex. 1 | 12.9 | 4.7 | 7.0 | 17.6 |
| Com. Ex. 2 | 10.5 | 6.3 | 4.7 | 16.8 |

TABLE 2

| | WI standard deviation in layer B | WI standard deviation in the other surface | Difference in WI standard deviation between outermost layers (absolute value) | Charge capacity recovery rate [%] through test for evaluating rate characteristic |
|---|---|---|---|---|
| Example 1 | 0.07 | 0.04 | 0.03 | 98.3 |
| Example 2 | 0.29 | 0.12 | 0.16 | 98.5 |
| Example 3 | 0.79 | 0.36 | 0.44 | 99.6 |
| Example 4 | 0.16 | 0.08 | 0.08 | 98.5 |
| Example 5 | 0.35 | 0.30 | 0.05 | 98.1 |
| Com. Ex. 1 | 0.06 | 0.07 | 0.01 | 96.2 |
| Com. Ex. 2 | 0.92 | 0.31 | 0.61 | 98.0 |

In Table 2, the "WI standard deviation in layer B" is a WI standard deviation measured in the aramid layer (i) for Example 3 and is a WI standard deviation measured in the layer B for each of the other Examples and Comparative Examples. Moreover, the "WI standard deviation in the other surface" is a WI standard deviation measured in the aramid layer (ii) for Example 3 and is a WI standard deviation measured in the layer A for each of the other Examples and Comparative Examples. The "difference in WI standard deviation between outermost layers (absolute value)" is an absolute value of a difference between the "WI standard deviation in layer B" and the "WI standard deviation in the other surface".

As shown in Table 2, the nonaqueous electrolyte secondary batteries including the nonaqueous electrolyte secondary battery laminated separators (1) through (5) which were prepared in Examples 1 through 5 had the charge capacity recovery rates through test for evaluating rate characteristic which are higher than those of the nonaqueous electrolyte secondary batteries including the nonaqueous electrolyte secondary battery laminated separators (6) and (7) which were prepared in Comparative Examples 1 and 2.

As such, it has been found that the nonaqueous electrolyte secondary battery laminated separator in accordance with an embodiment of the present invention can improve the long-term battery characteristic of the nonaqueous electrolyte secondary battery.

INDUSTRIAL APPLICABILITY

A nonaqueous electrolyte secondary battery laminated separator in accordance with an embodiment of the present invention is usable for production of a nonaqueous electrolyte secondary battery having an excellent long-term battery characteristic.

The invention claimed is:

1. A nonaqueous electrolyte secondary battery laminated separator comprising:
a polyolefin porous film; and
a nonaqueous electrolyte secondary battery porous layer which is stacked on one surface or both surfaces of the polyolefin porous film,
an absolute value of a difference between (i) a standard deviation value of a whiteness index defined in E313 of the American Standards Test Methods in a first outermost layer of said nonaqueous electrolyte secondary battery laminated separator and (ii) a standard deviation value of the whiteness index of a second outermost layer of said nonaqueous electrolyte secondary battery laminated separator being greater than 0.01 and being 0.60 or less,
a greater one of the standard deviation value of the whiteness index in the first outermost layer and the standard deviation value of the whiteness index in the second outermost layer being 0.06 or more and 0.91 or less.

2. The nonaqueous electrolyte secondary battery laminated separator as set forth in claim 1, wherein:
the first outermost layer is the polyolefin porous film; and
the second outermost layer is the nonaqueous electrolyte secondary battery porous layer.

3. The nonaqueous electrolyte secondary battery laminated separator as set forth in claim 1, wherein the nonaqueous electrolyte secondary battery porous layer contains one or more resins selected from the group consisting of polyolefin, a (meth)acrylate resin, a fluorine-containing resin, a polyamide resin, a polyester resin, and a water-soluble polymer.

4. The nonaqueous electrolyte secondary battery laminated separator as set forth in claim 1, wherein the nonaqueous electrolyte secondary battery porous layer contains a polyamide resin.

5. The nonaqueous electrolyte secondary battery laminated separator as set forth in claim 4, wherein the polyamide resin is an aramid resin.

6. The nonaqueous electrolyte secondary battery laminated separator as set forth in claim 5, wherein the aramid resin is one or more aramid resins selected from the group consisting of poly(paraphenylene terephthalamide), poly(metaphenylene terephthalamide), and a paraphenylene terephthalamide/metaphenylene terephthalamide copolymer.

7. The nonaqueous electrolyte secondary battery laminated separator as set forth in claim 1, wherein the nonaqueous electrolyte secondary battery porous layer contains a heat-resistant filler.

8. The nonaqueous electrolyte secondary battery laminated separator as set forth in claim 7, wherein the heat-resistant filler is an inorganic filler.

9. The nonaqueous electrolyte secondary battery laminated separator as set forth in claim 8, wherein the inorganic filler contains one or more inorganic substances selected from the group consisting of alumina, boehmite, aluminum hydroxide, magnesium hydroxide, magnesium oxide, titanium oxide, and silica.

10. A nonaqueous electrolyte secondary battery comprising a nonaqueous electrolyte secondary battery laminated separator recited in claim 1.

\* \* \* \* \*